Feb. 25, 1964 — E. L. MOODY — 3,122,393
VISOR CONSTRUCTION
Filed Oct. 31, 1960 — 2 Sheets-Sheet 1

INVENTOR.
EUGENE L. MOODY
BY
ATTORNEYS

Feb. 25, 1964 E. L. MOODY 3,122,393
VISOR CONSTRUCTION
Filed Oct. 31, 1960 2 Sheets-Sheet 2

INVENTOR.
EUGENE L. MOODY
BY
Learman, Learman & McCulloch
ATTORNEYS 3,122,393
VISOR CONSTRUCTION
Eugene L. Moody, Saginaw, Mich.; Avis Moody, administratrix of said Eugene L. Moody, deceased
Filed Oct. 31, 1960, Ser. No. 66,059
14 Claims. (Cl. 296—97)

This invention relates to visor constructions and more particularly to a visor construction in which provision is made perimetrally around the roof of a motor vehicle or the like for protecting the occupants from glare.

Briefly, the invention is concerned with a visor construction in which track sections are provided perimetrally around the roof of a vehicle. These track sections are tubular in nature and slideably receive guide portions provided on the upper edges of a plurality of longitudinally adjustable visors which are employed. While extensible visors have been proposed in the past, they have been of a type in which a track, secured to the visor, received a guide rod or the like which supported the visor from a mounting bracket. Such a construction is not at all feasible with the system disclosed herein, wherein the visors must slide past track supporting brackets.

Accordingly, one of the prime objects of the invention is to provide a visor in which an enlarged guide portion at the upper edge of the visor is received within track sections mounted perimetrally on the roof of the vehicle so that the visor is passable from one track section to another, past the brackets which support the track sections.

Another prime object of the invention is to provide a visor which is longitudinally flexible and can be moved in a curvilinear track section from a side track section to an end track section.

A further object of the invention is to provide a visor construction in which the visor or visors can be economically, integrally formed of plastic in one piece and do not employ any moving parts which could malfunction.

A further object of the invention is to provide a visor in which the upper portion thereof down to eye level, while of a nontransparent character, includes at least one vertically extending, transparent, tinted strip permitting the driver of a vehicle to view street traffic lights.

Still a further object of the invention is to provide a visor construction of a transparent, tinted sheet material which is simply slideably detachable from the track units which support it, for cleaning purposes.

A further object of the invention is to provide a visor construction in which the visor-supporting track is adapted to be supported by visor brackets of various design already in contemporary vehicles.

Other objects and advantages of the invention will be pointed out specifically or will become apparent from the following description when it is considered in conjunction with the appended claims and the accompanying drawings, in which:

Figure 1:
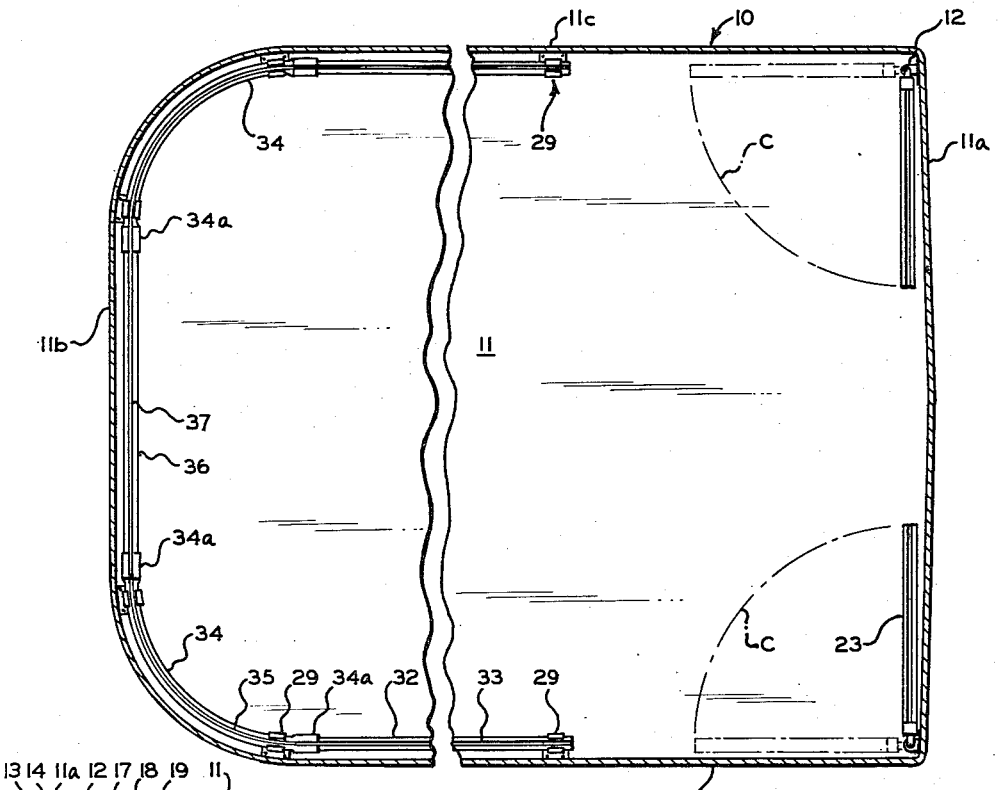
FIGURE 1 is an inverse plan view taken through an automotive vehicle and illustrating the underside of the visor-supporting tracks which are supported adjacent the roof of the automobile, the visors being omitted from the drawing in this view and the diagrammatic lines indicating swung over positions of the front track sections.

Referring now more particularly to the accompanying drawings, wherein a preferred embodiment of the invention is disclosed, a numeral 10 generally indicates a vehicle body including a roof portion 11 with curvilinearly sloped front and rear edge portions 11a and 11b, respectively, and curvilinearly sloping side edge portions 11c. At the front edge 11a of the vehicle roof 11, just above the windshield of the vehicle, are the usual visor-supporting brackets which are generally indicated at 12, and these may be of the type shown in Keating et al. Patent No. 2,939,741, or may be of any other suitable design.

Figure 2:
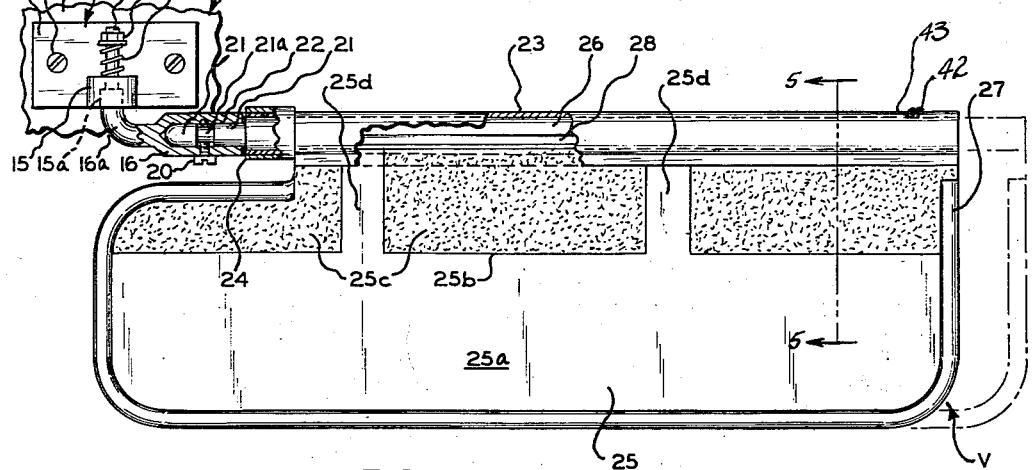
FIGURE 2 is a partly sectional, side elevational view of a visor unit which is employed adjacent the front windshield of the vehicle and is swingable on a conventional visor bracket from the front windshield over to a side window in the manner indicated in FIGURE 1.

As shown in FIGURE 2, a typical bracket 12 may comprise a base plate 13 secured to the wall 11a by screws 14, the plate 13 having a bearing 15 with a vertically extending shouldered bore 15a which receives the rod end 16a of a socket member 16. The upper end of the rod portion 16a is reduced and threaded as at 17, and a nut 18 retains a coil spring 19 which is in a state of compression and accordingly resists turning action of the rod portion 16a in the bearing 15. The socket member 16 is longitudinally split in the same manner as in the patent mentioned and an axially offset screw 20 is provided to snugly secure a plug 21 within the bore 22 of the socket 16, the plug 21 having a neck potrion 21a to pass the adjusting screw 20 which determines how easily the plug 21 will rotate within its socket 16. As usual, the screw 20 is clamped sufficiently to hold the split portions of the socket member 16 so that there is frictional resistance to turning of the plug 21 in the bore 22 of the socket member 16, and the plug 21 will remain in any rotatably adjusted position despite the weight of the visor generally designated V which is fixed on the plug 21 and rotates therewith. A longitudinally extending track 23 fits over the free end of the plug 21 and a sleeve 24, force-fitted in position, clamps the track 23 on the plug 21.

Figure 3:
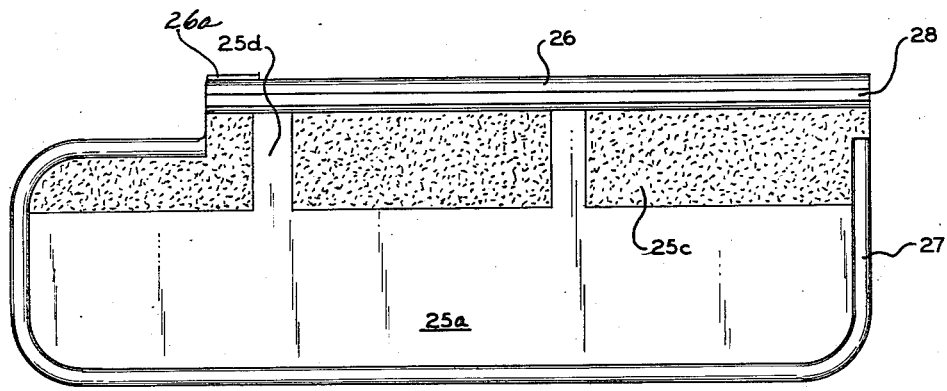
FIGURE 3 is a similar side elevational view of the visor only.
Figure 5:
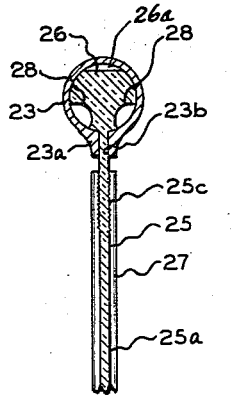
FIGURE 5 is a transverse, sectional view taken on the line 5—5 of FIGURE 2.

The visor V shown in FIGURES 2, 3, and 5 is designed to be slideably received by a track section 23 at the front end of the vehicle and comprises a tinted, transparent, plastic sheet 25 having a bead 26 molded integrally along its upper edge which is of a size to be slideably received within the track section 23. While the socket member 16 closes the one end of the track section 23 and acts as a stop, preventing leftward movement of the visor V shown in FIGURE 2, it is to be understood that the opposite end of the track section 23 is open so that the visor V can be extended longitudinally therefrom or slid entirely out of the track section 23 for purposes of cleaning.

The visor V, which can be molded of any acrylic type plastic such as Plexiglas and includes the sheet or blade portion 25, which may be on the order of $\frac{3}{16}$ of an inch in thickness, also has a reinforcing plastic or metal edge bead 27, as shown, which terminates just below the continuous bead portion 26. It is to be observed that the bead portion 26 is longitudinally channeled as at 28 along its lower surface portions where the weight of the visor is supported by the track section 23, so that only reduced areas of the bead 26 and track 23 are in contact. Accordingly, the frictional resistance to relative movement is controlled and the visor V is readily slideable longitudinally to various extended positions in which there is just sufficient frictional resistance that it remains satisfactorily in a given extended position. It will be seen that the track section 23 includes dependent lips 23a defining a passage 23b through which the sheet or blade portion 25 of the visor can extend, and this construction effectively prevents relative rotation of the visor V and track 23.

Figures 6, 8:
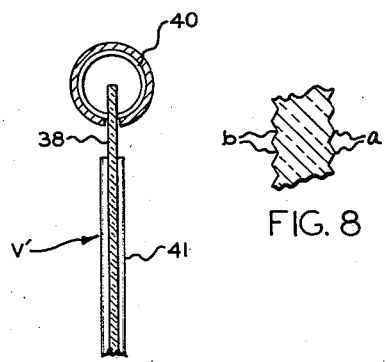
FIGURE 6 is a transverse, sectional view of the visor of FIGURE 4 received within a track section.
FIGURE 8 is an enlarged, transverse view illustrating the manner in which the upper portions of the visor are configured.

While the lower portion 25a of the blade or sheet section 25 of the visor V is transparent, the upper portion proceeding from the eye level line 25b is stippled as at 25c. As shown in FIGURE 8, both side surfaces of the sheet 25 are stippled and the strippling is arranged, as shown in FIGURE 8, with its projections a laterally opposide the recesses b in the opposite stippled surface. With this construction, the stippled areas 25c are substantially nontransparent. However, it will be seen that the stippled portions 25c are broken by transparent, tinted strips 25d which extend from the transparent, tinted portion 25a to the bead 26. The portions 25d permit the driver of a vehicle to view a stop light or the like on a street corner and a pair are provided at spaced apart intervals so that stop lights on either corner may be viewed with relatively little longitudinal adjustment of the visor V in the track 23.

Figure 7:
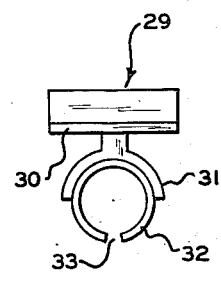
FIGURE 7 shows a typical bracket of the type which is employed to support the side and rear track sections.

The manner in which the track sections 23 are swingable in the manner of the conventional visor to the sides 11c is indicated by the diagrammatic lines c in FIGURE 1. Mounted on the side edge portions of the roof 11c are brackets generally designated 29 which can be formed as shown in FIGURE 7. In FIGURE 7 the brackets are shown as comprising a base plate 30, which can be secured by screws to the roof 11 or side edge 11c thereof, and mounts a socket 31. These brackets 29, which receive the side track sections 32, rotatably receive them. However, the fit is such that there is adequate frictional resistance to turning to support the weight of a visor in elevated position, should it be desired to move a visor supported by a track 32 to an upward position adjacent the roof 11 of the vehicle. The tracks 32 are simply tube sections open at both ends and having a slit 33 permitting the visor blade to extend outwardly.

Similar curvilinear track sections 34 are supported by brackets 29 rearwardly of the side track sections 32 and have enlarged bearing portions 34a at their ends rotatably receiving the rear ends of side track sections 32. The fit of the side track sections 32 is sufficiently snug, when considering also the fit of the sections 32 in brackets 29, that there is frictional resistance to turning, adequate to support the weight of a visor which is in out-of-the-way position against the roof of the automobile. Provided in the track sections 34 are slits 35 which align with the slits 33.

A rear track section 36 identical to the side track sections 32 is rotatably received by the rear bearing portions 34a of the curvilinear track sections 34 in the same manner and has a similar slit 37 aligning with the slits 35 in the curvilinear track sections 34. The fit of the rear track sections 36 in the rear bearing portions 34a of the curvilinear track sections 34 is also such that there is frictional resistance to turning adequate to support one or more visors in "up" position.

Figure 4:
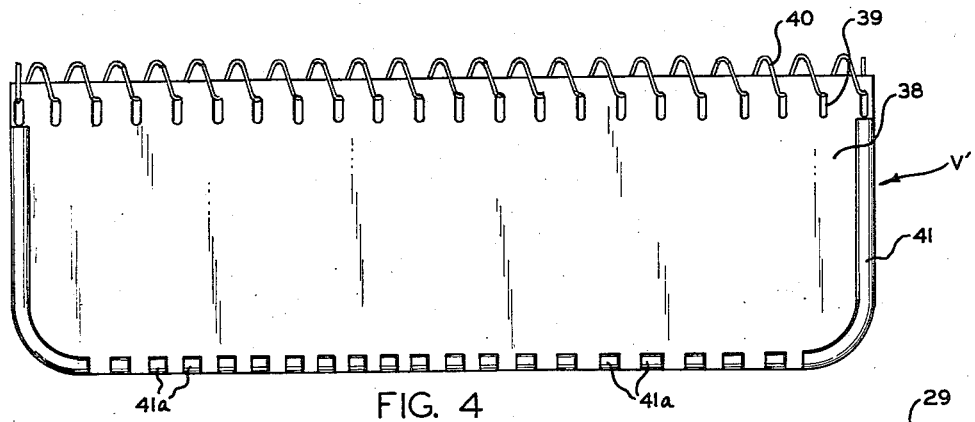
FIGURE 4 is a side elevational view similar to FIGURE 3, showing a visor of the type which is employed near the rear end of the vehicle and is able to traverse the curvilinear rear track sections.

While the visor V shown in FIGURES 2 and 3 can readily be shifted from track sections 23 to track sections 32, the visors V are not capable of negotiating the curved track sections 34. Accordingly, visors V' (FIGURES 4 and 6) are provided which are normally housed in the rear track section 36 and comprise a transparent blade or sheet portion 38 of the same tinted plastic material, which has a series of longitudinally spaced slots 39 provided along its upper edge, as shown in FIGURE 4. In place of the bead 26, a guide portion 40 is provided which comprises a coil spring of the same diameter. The edge beading 41 includes identical side portions but the bottom section is made up of spaced apart sections 41a, as shown. Visor V' is built to flex longitudinally so that it can negotiate the curvilinear sections 34 and move from the rear track section 36 to the side sections 32. A pair of visors V' can be employed at the rear of the vehicle with each extending part way into a curvilinear track section 34. It is clear that the guide portions 26 or 40 on the visors must be received by the track sections, since otherwise the visors could not pass the brackets 29.

To prevent the visor V from leaving the track 23, a shoulder 26a (FIGURES 3 and 5) is provided thereon which engages the removal stop set screw 42 which is secured in a threaded opening 43 provided through track 23.

It should be apparent that I have perfected a visor construction which is of very practical nature and provides sun glare protection for all occupants of a vehicle, regardless of the direction the vehicle is traveling with respect to the sun and the position of the sun in the sky. The system described is, of course, of particular value in the wintertime on days when, with snow on the ground, the sun's rays are not obscured.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. In a visor construction for mounting in a vehicle adjacent the roof thereof; a generally oblong, transparent, tinted, thermoset plastic sheet; a guide bead fixed along the upper edge thereof; a longitudinally extending, tubular track slideably receiving said guide bead within it and having an opening of reduced size relative to said bead so that said track provides a bearing for said bead formed along the lower portion thereof to pass said sheet while preventing relative rotation of said sheet and track; a plug extension portion fixed to said track extending beyond said bead at one end thereof; and longitudinal socket means receiving said extension portion and securing said visor construction to the vehicle in a manner to permit rotation of said track and sheet about a longitudinal axis and a vertical axis; the guide bead being restricted from longitudinal sliding movement in said track by a predetermined frictional resistance only and the opposite end of said track being open to permit longitudinal extension of said sheet.

2. The combination defined in claim 1 in which said bead is molded integrally with said sheet along the upper edge thereof.

3. The combination defined in claim 2 in which said visor is formed of a longitudinally flexible material and said guide portion is flexible.

4. In a visor construction for mounting in a vehicle adjacent the roof thereof; a generally oblong, transparent, tinted sheet having a guide portion of enlarged diameter along the upper edge thereof; a longitudinally extending, tubular track slideably receiving said guide portion within it and open along the lower portion thereof to pass said sheet while preventing relative rotation of said sheet and track; a plug received within one end of said track; bracket means releasably clamping said plug and securing said visor construction to the vehicle in a manner to permit rotation of said track and sheet about a longitudinal axis and a vertical axis; the opposite end of said track being open to permit longitudinal extension of said sheet; and a sleeve force-fitted on said one end of said track to secure said plug in position.

5. In a vehicle having a roof with end and side edges, and an end window and side windows; bracket means adjacent an end window and side window; a first generally linear, tubular track section supported by said bracket means adjacent said end window, at least one end of said first track section being open; a dependent, longitudinally flexible visor having an enlarged guide portion slideably received within said first track section; a second tubular track section secured along the side edge of said roof at the level of said first track and slideably receiving said guide portion; said second track section being open at its one end adjacent to said first track section; and a third tubular, curvilinear track section connecting said first and second track sections and having open ends to pass said visor when it is slideably passed between said first and second track sections.

6. In a vehicle having a roof with end and side edges, and an end window and side windows; bracket means adjacent an end window and side window; a first generally linear, tubular track section supported by said bracket means adjacent said end window, at least one end of said first track section being open; a dependent, longitudinally flexible visor having an enlarged guide portion slideably received within said first track section; a second tubular, curvilinear track section connecting with said first track section and having an open end to receive said visor when it is slideably passed from said first track section; and means supporting said curvilinear track section on the vehicle.

7. In a vehicle having a roof with front, rear, and side edges and a front windshield and side windows; bracket means adjacent the front edge of said roof; a first tubular track carried at one end by said bracket means and movable about its longitudinal axis and also about said bracket means on a generally vertical axis to be swingable from a position generally parallel with the front windshield to a position generally parallel with a side window, the opposite end of said first track being open; a dependent visor having an enlarged guide portion slideably received within said first track; and a second tubular track secured along the side edge of said roof in front-to-rear alignment with said first track when the latter is in a position generally parallel with said side window; said second track being open at its front end to receive the guide portion of said visor which is slideably received by said second track.

8. In a vehicle having a roof with front, rear, and side edges and a front windshield and side windows; bracket means adjacent the front edge of said roof; a first tubular track carried at one end by said bracket means and movable about its longitudinal axis and also about said bracket means on a generally vertical axis to be swingable from a position generally parallel with the front windshield to a position generally parallel with a side window, the lower edge of said track being slitted and the opposite end of said first track being open; a dependent, transparent, tinted, plastic visor having an enlarged guide portion slideably received within said first track with the blade of the visor extending from said slit; and a second tubular track secured along the side edge of said roof in front-to-rear alignment with said first track when the latter is in a position generally parallel with said side window; said second track being similarly slitted and open at its front end to receive the guide portion of said visor which is slideably received by said second track.

9. In a visor construction for mounting in a vehicle adjacent the roof thereof; a generally oblong, transparent, tinted, thermoset plastic sheet having a guide portion fixed along the upper edge thereof; a longitudinally extending, tubular track slideably receiving said guide portion within it and open along the lower portion thereof to pass said sheet while preventing relative rotation of said sheet and track; and means connected with one end of said track for securing said visor construction to the vehicle in a manner to permit rotation of said track and sheet about a longitudinal axis and a vertical axis; the opposite end of said track being open to permit longitudinal extension of said sheet; said guide portion comprising a coil spring and said sheet having longitudinally spaced openings along its upper edge through which the convolutions of said spring pass.

10. In a visor construction for mounting in a vehicle adjacent the roof thereof; a generally oblong, transparent, tinted, thermoset plastic sheet having a guide portion fixed along the upper edge thereof; a longitudinally extending, tubular track slideably receiving said guide portion within it and open along the lower portion thereof to pass said sheet while preventing relative rotation of said sheet and track; and means connected with one end of said track for securing said visor construction to the vehicle in a manner to permit rotation of said track and sheet about a longitudinal axis and a vertical axis; the opposite end of said track being open to permit longitudinal extension of said sheet; said sheet having spaced part, enlarged, bottom reinforcing bead portions permitting the sheet to be deformed into a condition of lengthwise curvature.

11. In a visor construction for mounting in a vehicle adjacent the roof thereof; a generally oblong visor; a guide portion secured along the upper edge thereof; a longitudinally extending, tubular track slideably receiving said guide portion within it and having an opening of reduced size relative to said guide portion so that said track provides a bearing for said guide portion formed along the lower portion thereof to pass said visor while preventing relative rotation of said visor and track; plug and socket means connected with one end of said track for securing said visor construction to the vehicle in a manner to permit rotation of said track and visor about a longitudinal axis and a vertical axis; the guide portion being normally restricted from longitudinal sliding movement in said track and the opposite end of said track being open to permit longitudinal extension and removal of said visor.

12. The combination defined in claim 11 in which said visor is formed of tinted, transparent material.

13. The combination defined in claim 12 in which stippling extends from substantially the top edge of the visor down to eye level over substantially the length of the visor to define a substantially non-transparent area, said area being broken by at least one generally vertically extending, narrow, transparent, tinted strip.

14. The combination defined in claim 13 in which said area is broken by a second generally vertically extending, narrow, transparent, tinted strip spaced a predetermined ditsance from the said one strip.

References Cited in the file of this patent

UNITED STATES PATENTS

| 1,600,461 | Ensign | Sept. 21, 1926 |
| 1,807,760 | Snow | June 2, 1931 |
| 2,160,505 | Jacobs | May 30, 1939 |
| 2,207,668 | Hudgings | July 9, 1940 |
| 2,833,592 | Lewis | May 6, 1958 |
| 2,932,539 | Galbraith | Apr. 12, 1960 |

FOREIGN PATENTS

| 537,924 | Canada | Mar. 12, 1957 |
| 755,546 | France | Sept. 11, 1933 |
| 1,104,147 | France | June 8, 1955 |
| 1,223,089 | France | Jan. 26, 1960 |
| 325,237 | Great Britain | Feb. 10, 1930 |
| 567,958 | Great Britain | Mar. 9, 1945 |